March 28, 1950 R. RÜDENBERG 2,501,876
RADIO SCANNING DEVICE
Original Filed Aug. 14, 1943 4 Sheets-Sheet 1
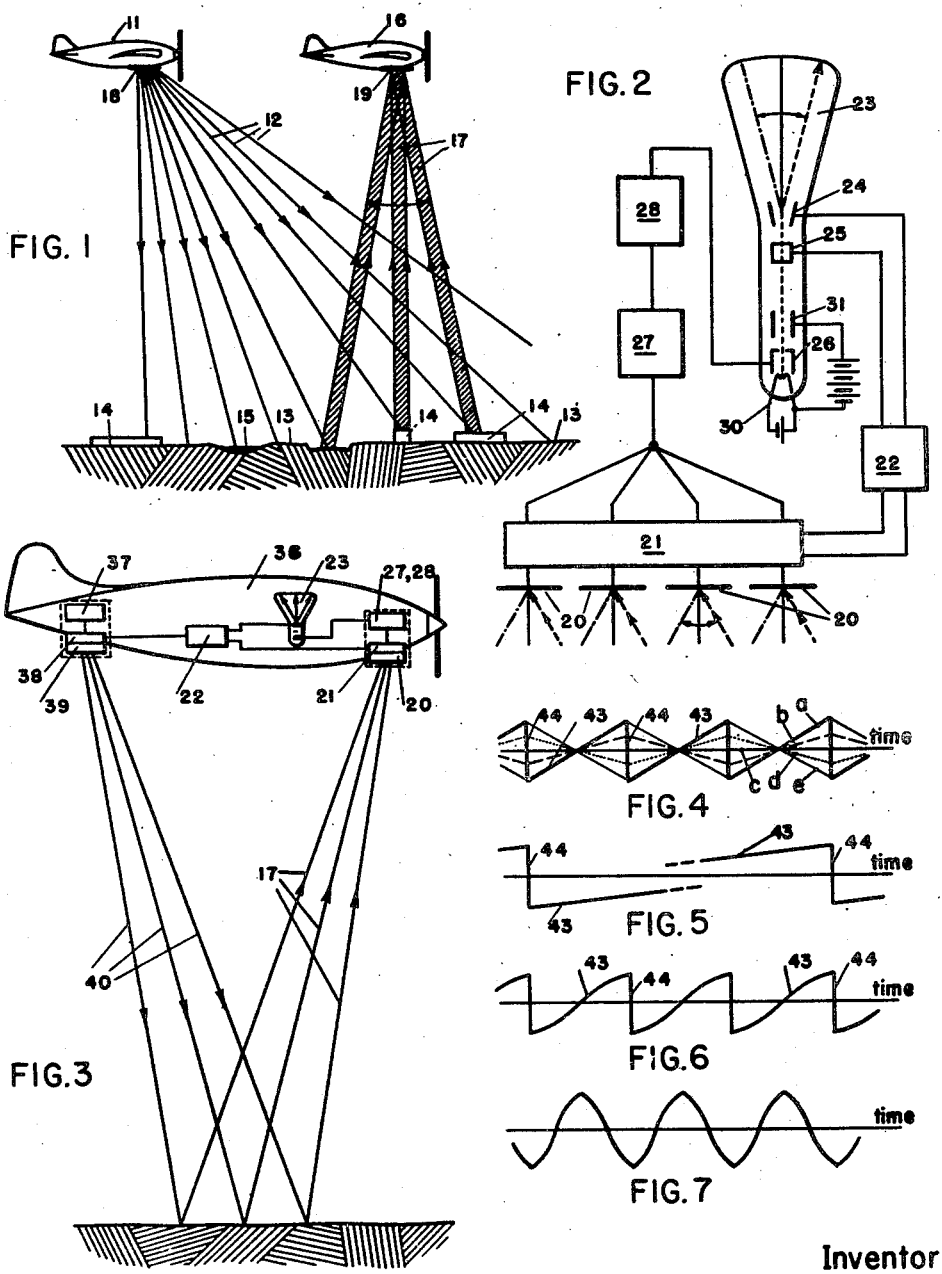
Inventor
Reinhold Rüdenberg
By *Heinrich Hershfield*
Atty.

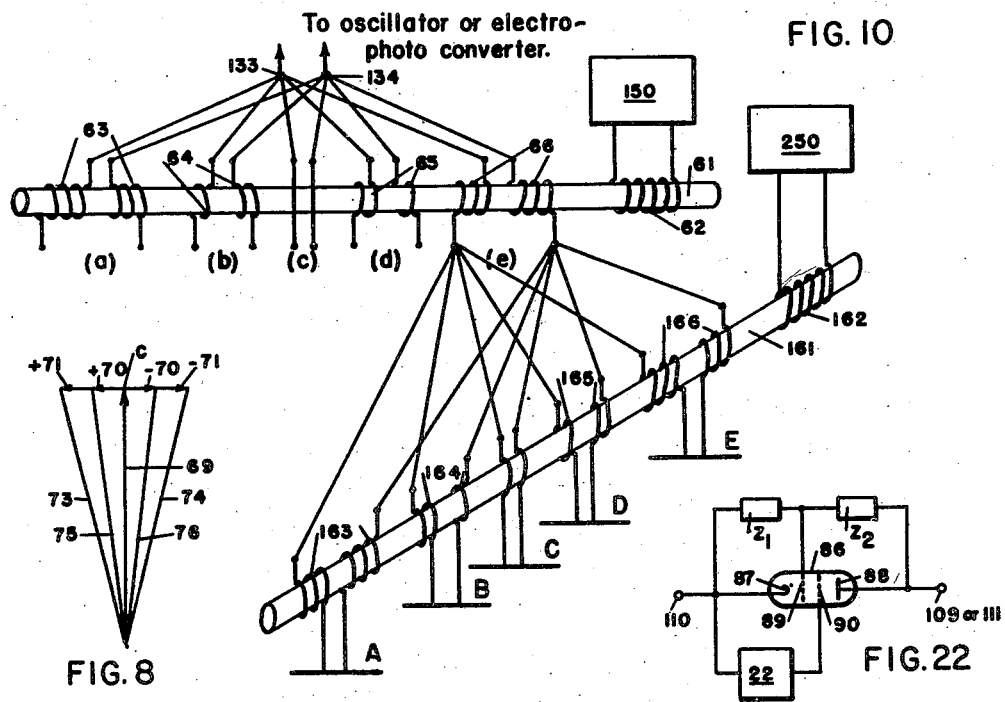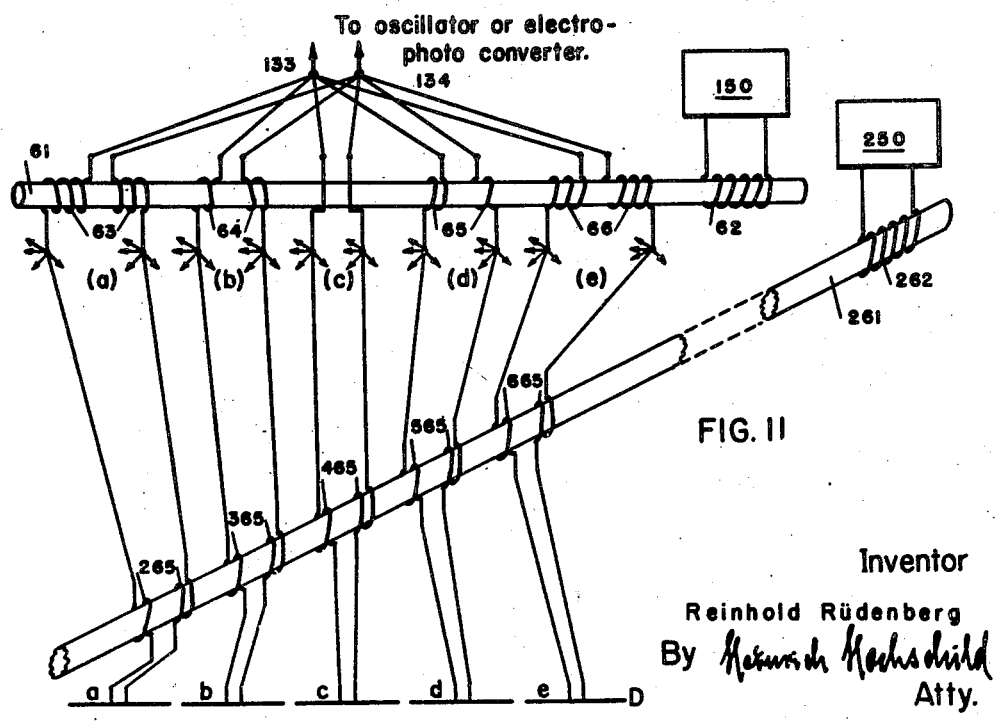

March 28, 1950    R. RÜDENBERG    2,501,876
RADIO SCANNING DEVICE
Original Filed Aug. 14, 1943    4 Sheets-Sheet 3
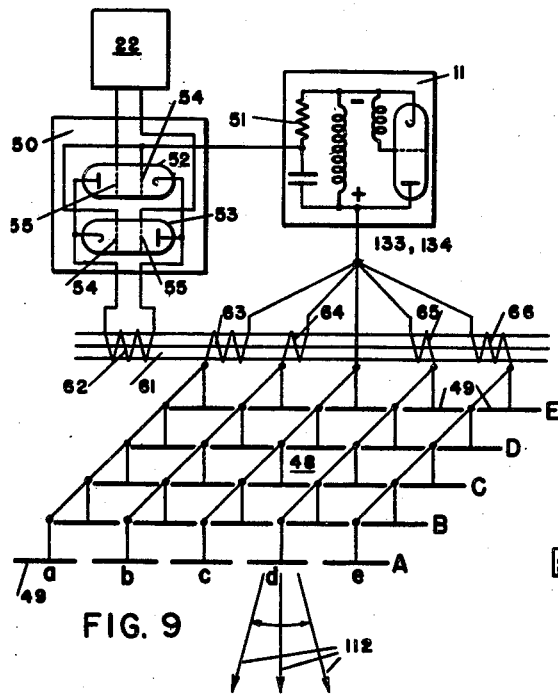
FIG. 9
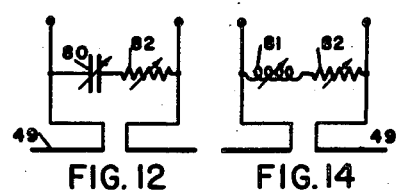
FIG. 12    FIG. 14
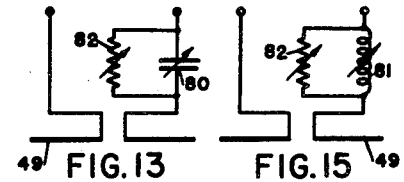
FIG. 13    FIG. 15
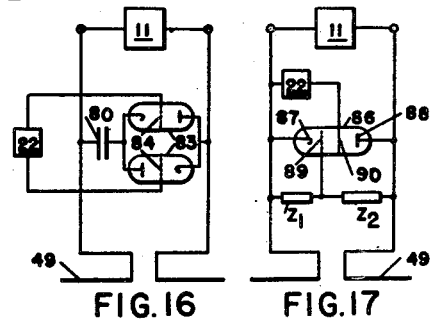
FIG. 16    FIG. 17
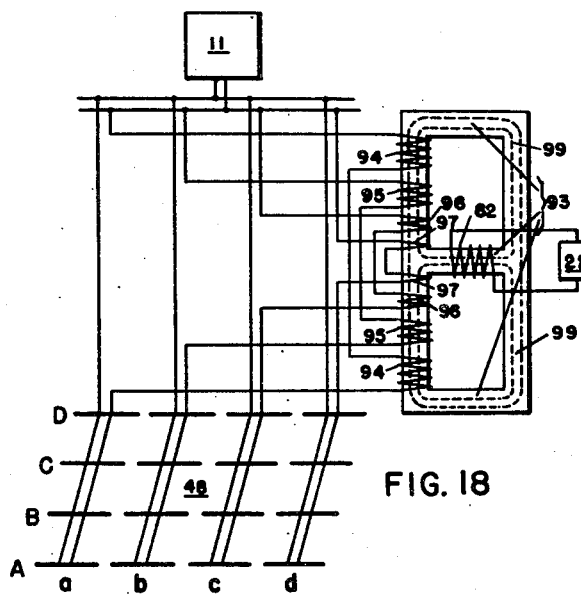
FIG. 18
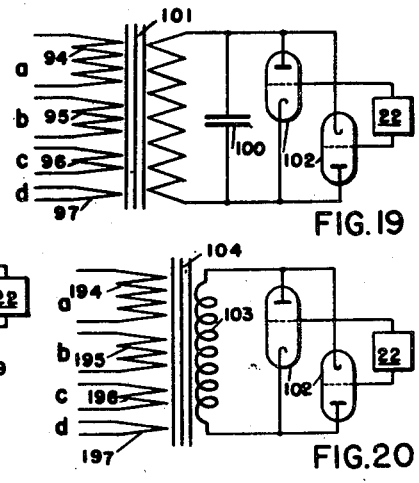
FIG. 19
FIG. 20
Inventor
Reinhold Rüdenberg
By *Heinrich Hecheschild*
Atty.

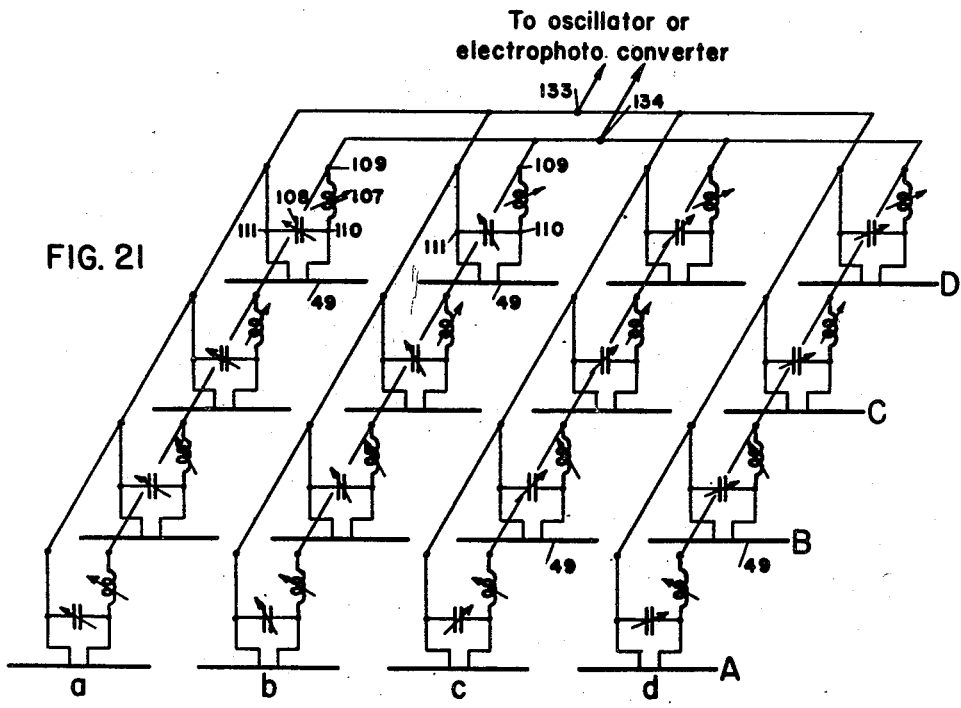

Patented Mar. 28, 1950

2,501,876

UNITED STATES PATENT OFFICE 2,501,876

RADIO SCANNING DEVICE

Reinhold Rüdenberg, Belmont, Mass.

Original application August 14, 1943, Serial No. 498,716. Divided and this application November 19, 1945, Serial No. 629,561

6 Claims. (Cl. 343—100)

This is a division of my co-pending application Serial Number 498,716, filed August 14, 1943, now abandoned.

The invention of the parent application is concerned with new methods of and apparatus for reproducing certain distinguishing qualities of distant objects, especially on or near the surface of the earth, on or near the surface of the water and also in the air.

A principal object of the invention disclosed in the said application is a new method of, and new apparatus for, producing a likeness or an image of a distant object; method and apparatus which are operable and effective even under adverse weather conditions—clouds, fog or rain for instance—or insufficient illumination, during the night, or owing to excessive illumination caused by conflagration or the like. More specifically it is an object of the said invention to reproduce as a visible image or representation of an object the electric pattern which corresponds to the contrasts in the electric and magnetic properties of the object.

For attaining to this end, I make use of the phenomenon that an object, such as the surface of the earth, when irradiated by means of electric waves reflects such incident electric waves due to its electric conductivity, magnetic permeability and dielectric constant, if these qualities are different from those of the air. Adjacent parts on the surface, as for example water, soil, rock, or structures of wood, brick, concrete, or metal, have different reflection coefficients. The electric wave reflection is slight at soil, strong at water surfaces, stronger at metallic bodies owing to their high electric conductivity, and particularly strong at iron structures owing to their high magnetic permeability. The reflected electric waves thus form a pattern similar to that of ordinary light. In contrast therewith however, even concealed structures such as steel structures embedded within the ground, a medium of low conductivity, or even on or below the surface of water, manifest themselves in this electric pattern. The present invention makes use of this phenomenon for producing an image of an object by transforming its electric pattern into a visible picture.

It is an object of the present invention to activate this pattern for thus enabling the observer to receive by means and methods disclosed in my aforesaid copending application at an observation or receiving station signals corresponding to this pattern and to transform these signals into a visible image of the object.

For this purpose, in accordance with the invention, the apparatus for activating or producing a radiant image of the electric pattern of a distant object, corresponding to the contrasts in the electric and magnetic properties thereof, includes an oscillator for producing electric waves, a directional electric wave converter connected thereto, and a scanner adapted to control by means of electric rhythms said converter so as to scan the pattern by means of said electric waves.

The term "electric wave converter," as used herein, is to comprise generally an electromagnetic device, such as an antenna, a dipole, a dipole array, or any other type of conductor or guide, or system of conductors or guides, linearly, areally, or spatially extended, which forms the source or the sink of the electric waves, or alternatingly both. This electric wave converter thus converts conductor-bound, -conducted or conductor-guided-, electric energy into free radiating energy or, vice-versa, receivers or collects free radiating energy and converts it into conductor-bound energy, or alternatingly both.

The devices of the invention may be employed for producing an image of the electric pattern of the distant object by focussing and irradiating the distant object with the waves produced in accordance with this invention. The signals emanating from the object and produced through this irradiation in accordance with the contrasts in space of the electric and magnetic properties of said object may then be received and converted into a scanned visible image of the pattern preferably by means of methods and apparatus disclosed in my aforesaid co-pending application Serial No. 498,716, filed on August 14, 1943.

A further object of the invention is the arrangement of a scanning device which includes a scanner for producing rhythmical scanning oscillations and a modulator coupled thereto and controlled thereby for displacing the phase of the wave oscillations within the elements of the electric wave converter and distributing over the various of said elements the phase modulating reaction in proportion to the respective positions of said elements within said electric wave converter and controlled in its intensity in accordance with the curve shape of the scanning oscillations and in the rhythm thereof.

Another object of the invention is the arrangement of a scanner which comprises a generator for rhythmic sweep oscillations for oscillating in the rhythm of the sweep oscillations a beam of electric waves converted by said converter and sweeping said beam across the distant object. The modulator is adapted to be excited from the conductor-bound energy of the waves converted in the wave converter and has control elements coupled to the generator for sweep oscillations, reactive elements and output elements, for phase modulating the oscillations within the wave converting elements by means of said reactive elements and controlling the phase modulating reaction in its intensity according to the curve shape of the sweep oscillations and in the rhythms thereof. The output elements are connected to the various of the wave converting elements and proportioned in accordance with the position in the eletcric wave converter of the respective wave converting element to which said output elements are respectively connected. The output elements thus form a phase distributor for distributing the phase modulating reaction over the several of said wave converting elements in proportion to the respective positions of said wave converting elements.

Other objects of the invention will in part become obvious and will in part appear hereinafter as the specification proceeds.

The lengths of the electric waves employed for producing the image of the electric pattern of a distant object are preferably chosen so as to give a good resolution of the contrasts. Thus wavelengths of one meter or more will for some purpose be short enough to produce a sufficiently accurate pattern, but wavelengths down to one decimeter or even one centimeter or less will give a much better resolution.

With relatively long waves, only a rough pattern of the object will be reproduced in the image; for instance of a certain area of the earth, to be reproduced from an aircraft, only the water and soil contrasts may become visible. For some applications of this invention, for a swift and general orientation from an aircraft, for instance, during the night or in invisible weather, this rough orientation will suffice as it may be supplemented by details from known maps of the district which is overflown.

One of the most important applications of the present invention will therefore be in aviation. The invention will for this reason be illustrated in the following specification, as far as any emitting station is concerned as embodied in an aircraft. It will be readily understood, however, that the use of the invention is not limited to any specific purpose or application.

Various embodiments of the invention will be set forth in the specification as it proceeds and will be illustrated in and by the accompanying drawings which are to be understood explicative of the invention and not limitative of its scope. Other embodiments incorporating the principles underlying my invention are feasible without departing from the spirit and ambit of my appended claims.

In the drawings:

Fig. 1 illustrates diagrammatically two airplanes respectively irradiating the surface of the earth and receiving a scanned beam of electric waves reflected therefrom;

Fig. 2 is a block diagram of a receiving and image reproducing station;

Fig. 3 is a block diagram of a common transmitting and receiving station on an airplane;

Fig. 4 illustrates an example of the electric oscillation of a line sweep generator;

Fig. 5 shows a similar electric oscillation of a frame sweep generator;

Figs. 6 and 7 show two other examples of electric oscillations of line sweep or frame sweep generators;

Fig. 8 is a vector diagram showing the amplitudes of the wave oscillations and their phases modulated by sweep oscillations;

Fig. 9 illustrates in perspective a dipole array with a scanning device and a phase sweeper and distributor represented partly as a block diagram and partly as a circuit diagram;

Fig. 10 illustrates in the same manner of representation a modification of the phase sweeper and distributor of Fig. 9;

Fig. 11 illustrates a modification of a detail of Fig. 10;

Figs. 12 to 17 show various circuit diagrams of examples of phase displacing reactances connected to the electric wave converters;

Fig. 18 illustrates, partly in perspective, another embodiment of a dipole array with the circuit diagram of a scanning device;

Figs. 19 and 20 illustrate circuit diagrams of two further embodiments of a phase sweeper comprising phase displacing reactances and phase distributors;

Fig. 21 illustrates a perspective of a dipole array with circuit diagrams of two phase sweepers with which each dipole is provided;

Fig. 22 is a block diagram of an individual phase sweeper of Fig. 21.

General remarks

In the drawings, I have illustrated the invention diagrammatically in part by symbols or block diagrams as conventional in the art of electrical engineering, high-frequency technique and television. In favor of clearness of representation, I have omitted from the showing some details of the tube circuits, their direct current sources, coupling or separating reactances, neutral and ground potential lines, and conventional transformers or impedors, namely electric devices the purpose of which is to introduce impedance into a circuit. The omitting of these details is admissible, the more so as the design of all these elements and their connections in the tube circuits are well known in the art.

Furthermore, for the clearness of representation and in order to avoid crowding of the drawings by repetitions, I have shown in some instances the terminals and lines of the wiring system by only one terminal and line, and have thus not specifically indicated the return conductors or other terminals or lines symmetrical or identical with those illustrated in the respective figure. In such instances, the terminal or line shown, symbolizes, as conventional in the art, a two- or more-phase or pole system, as the case may be.

Finally, also for the purpose of a clear representation and enhancing the readability of the drawings, I have indicated some of the apparatus by legends, apparatus which either are known in related arts or have been extensively shown herein on other figures.

In all figures, like parts have been designated by like characters.

General principles and arrangements

Fig. 1 illustrates diagrammatically the general principle underlying my invention in one embodiment. In this example, an airplane 11 is shown which is provided with a transmitting station 18 which emits electric waves, as indicated by 12, directed towards the ground 13. These waves may irradiate on the surface of the earth a broad region under a second airplane 16 on which there is arranged a receiving system 19 tuned to the wavelength of the transmitter.

This receiving system is provided with apparatus for focussing and receiving the electric signals emanating from the irradiated area or object and produced in accordance with the electric and magnetic properties of the object by irradiation through, and reflection of, the electric waves emitted from airplane 11. Thus, if on the irradiated area, there are objects of various electric and magnetic properties, for instance soil 13, structures 14, water 15, or the like, they will therefore, when irradiated, form an electric pattern corresponding to the contrasts in their electric and magnetic properties and emit signals which may be received on airplanes 16 and converted into a visible image of the pattern.

Irradiation, or emission, and reception may be made both from aircraft; or, as the reflection of the waves, as shown hereinafter, is diffuse, irradiation may be made from the ground, by using a separate directional emitting system, especially shortwave, and reception may be had from above.

Conversely, irradiation may be effected from above and reception made below on the ground, or both irradiation and reception may be made on the ground.

Reception and image production will preferably be made on the same station; however, as for instance on observation and reconnoitering service, the signals emanating from the irradiated object may be focussed and received from the reconnoitering aircraft and from here transmitted to a distant ground station or a station on sea in a manner similar to that used in television.

The receiving system, as described in detail in my copending application Ser. No. 498,716, is arranged for sharp direct'onal reception so as to be excited only from the radiation of a narrow spot of the object, on the surface of the earth for instance, as indicated by the shaded beams 17 in Fig. 1, and for this purpose is provided with a directional antenna system 20, Fig. 2, dipoles for instance.

The receiving system as described in my copending application, is provided with a scanner comprising a generator 22 for sweep oscillations, and a phase sweeper 21 coupled thereto, which enforces a variation of the direction of reception. As will be set forth in full detail hereinafter, this phase sweeper supplies to the electric wave converter, which converts conductor-bound energy into wave energy and vice versa, an energy component displaced with respect to the phase of the conductor-bound energy of the wave converter and oscillating as to its magnitude in the rhythm of the sweep oscillations.

The sweeping energy thus consists of two components, one of generally constant magnitude, the other phase displaced and of rhythmically controlled oscillating magnitude. The receiving system is further provided with an electrophotoconverter of any convenient type comprising an image tube 23 and appertaining tubes as rectifier or detector 27 and amplifier 28 connected to the control electrode 26 of the image tube. Crossed deflection elements, for example plate pairs 24 and 25, of the image tube are respectively connected to, and controlled by, the scanner 22, whereas filament circuit 30 and anode 31 are energized by any conventional sources as indicated on the drawing.

The reflected electric signals received by the scanned directional antenna system are thus rectified, amplified, and conducted to the intensity control of a television receiver, for example a cathode-ray tube, the beam of which is scanned synchronously with the scanning of the wave receiver. Thus every spot on the luminous screen of the cathode-ray tube corresponds to a certain spot on the surface of the earth. Strongly reflecting spots on the ground will reflect a strong signal into the receiving antenna system, when hit by the scanned receiving beam, and will thus produce a bright spot on the screen of the cathode-ray tube at the proper place, while weakly reflecting parts on a surface on the earth produce only a faint or dark spot on the screen at places which correspond to their position. In this way the image on the cathode-ray tube screen reproduces spot by spot the reflection pattern of the surface on the earth.

Instead of using a broadly radiating transmitter and a scanned directional receiver, I may use with similar effect a scanned directional transmitter and a broadly collecting receiver.

In this case the transmitting or sending apparatus will be provided with a scanner, as shown for instance in Fig. 9, which will be described in detail later on.

Whichever of both apparatus, transmitter or receiver, is provided with a scanner, the scanning of the object by means of this scanner, for irradiating it or for focussing the beam of signals reflected therefrom, should be done synchronously with the scanning of the image in the electrophotoconverter.

In order to increase the ratio of the secondary energy in the receiver to the primary radiating energy of the transmitter or sender and thereby to save much primary power, it is useful to arrange both transmitter and receiver for highly directional radiation and reception and to scan both synchronously with each other and with the image tube.

This is shown schematically in Fig. 3 wherein 36 is an airplane, 37 the oscillator of the transmitter which further comprises a phase sweeper 38 and an electric wave converter 39 as emitter. The receiver comprises, as in Fig. 2, an electric wave converter 20 as wave collector, a phase sweeper 21, and an electrophotoconverter 27, 28, 23. A sweep generator 22 is common to the three, transmitter, receiver, and electrophotoconverter, and controls them synchronously with one another. The object is thus irradiated spot by spot by a wave beam 40, and the reflected signals, beam 17, are received spot by spot and are converted, spot by spot, by said electrophotoconverter into a visible image of the electric pattern of the object. At one time, thus, only a single spot of the object, e. g. on the surface of the earth, is irradiated, a signal from this spot is received and converted into a corresponding bright or dark spot of the image. High precision, fidelity and definition of the reproduction in the image are thus obtained.

*Scanning, line and frame sweeping*

Since every definite spot of the object scanned by sweep movements of the electric wave beam is to correspond to a luminescent spot on the image screen the sweep oscillations employed for the scanning of the object may be those employed for the scanning of the luminescent spot or may be of the same character but separately generated, or of a similar appropriate type.

The electric wave beam will thus describe the object in two directions or along two coordinates, and, whereas movements, such as radial and circumferential, or in polar coordinates, or spirally of the general plane of the object to be imaged, are feasible, the object as a rule will be described in two directions perpendicular to each other, in rectangular coordinates; or in other words, along the object plane in lines and across the lines from one line to the next and after a number of lines back to the first, as is well known for screens in the art of television. In the following description and in the claims, the first of these movements, along the lines, will be understood when the term "line sweep" is used, and the second movement, across the lines, when the term "frame sweep" is used.

Sweep oscillations for producing these scanning movements are shown in Figs. 4, 6 and 7 for the line sweep and in Fig. 5, as a much slower ascending curve for the frame sweep.

In the examples of Figs. 4 and 5, and also of Fig. 6, the character of the curve is sawtoothlike. The slower ascending parts 43, the forward movements of the scanning beam, correspond to the forward movement of the luminescent spot for producing the visible impressions of the image whereas the rapidly descending branches 44 of the curve correspond to the return movements of the luminescent spot.

If oscillations approaching to sine character are used for the line sweep, either unilateral as in Fig. 6 or bilateral as in Fig. 7, the intensity of the outer parts of the image will be increased and this is useful for wide angle frames. With oscillations of bilateral character, such as shown in Fig. 7, visible impressions will be produced both in the forward and in the backward movement of the luminescent spot.

If the maximum angles over which the beams which respectively scan and sweep the object and the image screen are different from one another and one of the angles is wide, as indicated in Fig. 3 for the image beam, or both are wide, then it is advisable to oscillate that beam according to a time curve as shown in Fig. 6, in order to secure at large angles a slower angular sweep velocity than at small angles, and to obtain a uniform spot velocity in the object plane or in the image plane or to describe on said object or image substantially equal distances in equal periods of time, or to describe with said beam substantially equal areas in equal periods of time.

In cases where the maximum angle of scanning for an object for instance on the surface of the earth is very wide, it may be useful to scan both the beam on the object and the image beam according to a time curve as illustrated in Fig. 6 or Fig. 7 in order to direct a greater share of the radiation to the outer parts of the scanned area and to compensate for weaker reflection which these parts give under the influence of the inclined radiation.

These sweep oscillations or others of similar character will be produced in generators or oscillators appropriately constructed and controlled, as is known in the related arts. These generators or oscillators, for the purposes of this specification, will be termed "generators for sweep oscillations" or "sweep generators."

Scanning of the antenna beams

In order to scan the electric wave beam 40 of transmitter 37, 38, 39, Fig. 3, or beam 17 of the receiver 20, 21, or both, in the rhythm of the scanning of the luminescent spot, the wave beams, in view of the extremely short periods desirable for these oscillations, are oscillated by electric rhythms with the result that a completely visible image of the object is obtained and not only a single point as heretofore was the case. Various methods and apparatus embodying this feature of my invention will now be described.

A concentrated directional beam of electric waves is produced for instance by means of an electric wave converter comprising an array of dipoles 49, Fig. 9, arranged in a rectangular plane.

If all dipoles of this array are excited in the same phase of current, a beam perpendicular to the plane will be emitted, or if the array or electric wave converter is employed for receiving a beam of signals with coinciding phases reflected from the object, a beam perpendicular to said plane will be received.

In so far as the scanning oscillation of the emitted wave beam or of the received beam of signals is to correspond to the above described scanning movement of the luminescent spot and this is a movement resultant from movements in the directions of two coordinates, it will be convenient for the further explanation to attribute each element of the array as to its position in the array to two systems corresponding to its coordinates, in the present instance, one longitudinal system in the direction of the abscissae, and one transversal system in the direction of the ordinates.

To this end, I have designated the longitudinal rows, in the direction of the abscissae, with capital letters A, B, C, D, E, and the transversal columns, or the same dipoles but in the direction of the ordinates, with lower case letters, $a, b, c, d, e$.

If in such an array, as shown in Fig. 9, the partial waves which form the beam are emitted and received by all the dipoles at one side, column $a$, of the square plane, in slightly phase displaced relationship to those emitted and received by the opposite side, column $e$, and the waves emitted and received by the intermediate columns $b, c, d$ have a proportionally smaller phase displacement, the concentrated beam, whether it is emitted or is received by the array, is no longer emitted and received perpendicularly of the plane but is inclined thereto by an angle corresponding to the phase differences of the dipole columns.

I produce this effect by supplying to the wave converter an energy component displaced with respect to the phase of the conductor-bound energy of the dipoles or other wave converting elements, and distributing this phase displacing energy component over the various dipoles or electric wave converting elements in proportion to the distances between the electric wave converting elements or in accordance with the position of the respective element in the electric wave converter or the distance of the respective element from an arbitrarily and appropriately chosen origin, for instance the center of the two-coordinate system about which the dipoles or other wave converting elements are distributed. I control this rhythmically oscillating phase displacing energy component in its intensity according to the curve shape of the sweep oscillations and in the rhythm thereof. The beam will then oscillate in space in proportion to this intensity.

Rhythmically phase varying devices

The entire scanning device for the wave beams will therefore comprise the following elements:

(1) A scanner for producing scanning oscillations and (2) A phase sweeper coupled thereto and controlled thereby for displacing the phase of the wave oscillations within the elements of said electric wave converter and distributing over the various of said elements the phase varying energy component proportioned in accordance with the respective positions of said elements within said electric wave converter and controlled in its intensity in accordance with the curve shape of the scanning oscillations and in the rhythm thereof.

The phase sweeper thus comprises:

i. Reactive elements for displac'ng the phases of the oscillations within said wave converting elements;

ii. Control elements for controlling the phase varying energy component dependent upon curve shape and rhythm of the sweep generator oscillations;

iii. Output elements for distributing the phase varying energy component over the individual wave converting elements or groups of wave converting elements in accordance with their respective positions in the electric wave converter.

(2) i, ii, and iii may be separate elements or combined in part or as a whole or may be distributed over the electric wave converter as individual apparatus allotted to each individual wave converting element or dipole or group of wave converting elements or dipoles.

In the embodiment shown in Fig. 9, the phase varying energy component is produced in a phase sweeper 50. From the power oscillator 11, a 90° phase displaced oscillation is taken, by means of a resistor 51 for example, and is supplied to the phase sweeper 50. Phase sweeper 50 is provided with two inversely arranged grid controlled vacuum or amplifier tubes 52, 53, one grid 54 of which is controlled by the phase displaced wave oscillations of the power oscillator 11 whereas a second grid 55 is controlled by the sweep generator 22.

In this way, a 90° or otherwise phase displaced wave oscillation is varied in the rhythm of, and in conformity with, the sweep oscillations; its magnitude varying from full minus to full plus and back.

This energy component oscillating as to its magnitude in the rhythm of the sweep oscillation is supplied to the wave converter, to which conductor-bound energy is supplied by the oscillator 11, by means of an apparatus 61 which I call phase distributor.

This phase distributor 61, in form of a transformer, distributes over the wave converting elements 49 the phase displacing component proportioned in accordance with the respective positions of said wave converting elements in the electric wave converter or array 48.

To this purpose, a primary winding 62 of the phase distributor 61 is connected to the plate circuits of tubes 52, 53, and variously proportioned secondary windings or output elements 63, 64, 65, 66 are connected to the variously positioned wave converting elements.

For example, equally proportioned output elements 63 and 66—having equal numbers of turns —are connected to the outer wave converter columns a and e, respectively, which have the same coordinates in the coordinate system, in this instance: equal abscissae or the same distance from the symmetry line or axis of oscillation along wave converter column c. Corresponding to the opposite signs of these abscissae, coils 63 and 66 are of opposite directions of winding.

The next pair of wave converter columns b and d, likewise of equal abscissae or distances but of opposite signs are supplied from output elements 64 and 65, respectively, which between themselves are equal or of equal numbers of turns but of opposite directions of winding. In view of the smaller values of the abscissae or distances b and d, these elements 64 and 65 are however of an output which is lower than that of elements 63 and 66 or are of a proportionally lower number of turns.

In this way, to the dipoles or wave converting elements of the various columns of the array or wave converter, wave oscillations are supplied which may be represented by the vector diagram of Fig. 8. The amplitudes of the power oscillator wave oscillations, represented by 69, are equal for all of the dipoles. The phase varying oscillations, however, which oscillate with the same frequency as the wave oscillations but are 90° phase displaced thereto, vary in their amplitude or their intensity and with time in accordance with the shape of the sweep curve, e. g. Figs. 4, 6, or 7. This intensity, as to the maximum of its amplitude, is different for the various dipoles or wave converting elements and is larger in the dipoles of the outer columns, a and e, as the equally marked full line curves of Fig. 4 and the vectors +71 and −71, Fig. 8, indicate; is of medium magnitude in the dipoles of columns b and d, as the dashed line b and the dotted line d of Fig. 4, and the vectors +70 and −70, of Fig. 8 indicate; and finally is zero in the dipoles of the center column c, as line c of Fig. 4, and point c illustrate.

The vector of the resultant oscillations of the dipoles of column a thus fluctuates during one period of the sweep oscillations from vector 73 to vector 74 and back to 73, whereas, simultaneously, the vector of the resultant oscillations of the dipoles of column e fluctuates from vector 74 to vector 73 and back to 74, or vice versa; both columns having the same abscissae but of opposite signs or being equidistant from the symmetry line of the array, and coils 63 and 66 being inserted in opposite sense into the dipole lines. Similarly, the vectors of the resultant oscillations of the dipoles of columns b and d fluctuate during one period of the sweep oscillations from vector 75 to vector 76 and back to 75, and from 76 to 75 and back to 76, respectively, or vice versa.

Beam 112, Fig. 9, therefore, as the arrows indicate, is oscillated in space, in the rhythm of the sweep oscillations, about a transversal axis which lies in the plane of the array.

This oscillation may be used for the "line-sweeping" of the object.

For the second sweep oscillation, about a longitudinal axis in the plane of the array, frame sweeping for example, a second scanner will be required. This second scanner may correspond in its details to the first scanner described with relation to Fig. 9.

In the embodiments shown in Fig. 10, the first scanner, for line sweeping, is designated by 150. A second scanner 250, for frame sweeping, includes a second phase distributor 161. The arrangement may otherwise correspond to that of Fig. 9 or to that of one of Figs. 18 to 20 which will be described later on. A winding 62 of phase distributor 61 may be excited by phase displaced wave oscillations controlled by the line sweep oscillations the same as in Fig. 9 or as in Fig. 19 or 20 or by the line sweep oscillations themselves the same as winding 62 of Fig. 18 is excited. Similarly, winding 162 of phase distributor 161 which will be excited from frame sweep oscillations may be excited by phase displaced wave oscillations controlled by the frame sweep oscillations corresponding to either of the arrangements of Figs. 9, 19 and 20, or directly by frame sweep oscillations corresponding to winding 62 of Fig. 18.

Phase distributor 161, the same as phase distributor 61, may have a core of finely subdivided iron; or for very high frequency may be an air transformer.

Fig. 10 illustrates schematically for one column (e) of dipoles how the device of Fig. 9 is to be supplemented for every column. In this embodiment, each one of the output elements 63, 64, 65, and 66 is to feed one dipole column, for example winding 66 column e, and into the leads of each dipole of said column one output element of phase distributor 161 is inserted; thus element 163 into the leads of dipole A, e; element 164 into the leads of dipole B, e; element 165 into the leads of dipole D, e; and element 166 into the leads of dipole E, e.

In Fig. 10, I have shown only one of the secondary phase distributors, the one which is allotted to the dipoles of column e. Corresponding phase distributors which otherwise are identical with that shown and are connected identically therewith to corresponding circuits, are respectively connected to the output elements or coils 63, 64, 65 and to the terminals 133, 134 for the dipole columns, a, b, d, and c, as indicated by the open terminals designated with these letters.

The terminals (c) allotted to the dipoles of column c are directly connected to oscillator 11 since these dipoles as disposed in the transverse symmetry line of the array do not receive line sweep controlled rhythmically phase varying energy components. Similarly, all of the terminals (a), (b), (c), (d), and (e), are directly connected to the dipoles of row C since these dipoles as disposed in the longitudinal symmetry line of the array do not receive frame sweep controlled rhythmically phase varying energy components.

Each phase distributor, 61 on the one hand, and the five phase distributors 161a to 161e on the other hand, is provided with output elements proportioned in accordance with the value of the coordinate to whichever, abscissa or ordinate, the dipole or wave converting element fed by said output element is attributed in view of the phase distributor to which said output element belongs.

The five phase distributors, 161a to 161e, are working with exactly the same momentary magnitude and in exactly the same rhythm, and they may therefore, if desired, be combined into one phase distributor.

Fig. 11 illustrates such an arrangement for the output elements of one row of dipoles. Core 261 of the frame sweep sweeper carries five by four or twenty pairs of output elements, the dipoles of row C which in this example are in a neutral position being directly connected to the terminals (a), (b), (c), (d), and (e) of core 61. Of these twenty output elements, the pairs 265, 365, 465, 565, and 665, or those connected to the dipoles of row D have been shown in the drawing.

The output elements of the dipoles of the remaining rows, A, B, and E, on distributor 261, are arranged correspondingly and it will therefore suffice to have shown the coils or output elements for row D.

The wave converting elements are thus being supplied with a given main wave oscillation, each being submitted as to its current to two displacing reactions corresponding to the two components of the beam oscillation in space, reactions which are proportioned in accordance with the two coordinates attributable to said wave converting element with respect to its position in the electric wave converter and controlled in their intensity in accordance with the rhythm and curve shape of the respective sweep oscillation, line sweep, Fig. 4, 5 or 7 for example, frame sweep, Fig. 5 for example.

In this way the currents in the dipoles or wave converting elements are being rhythmically varied as their phases with phase angle differences in proportion to the spatial distances of the dipoles and the resultant beam is oscillated about the two axes of the electric wave converter in the rhythms of the line sweep and of the frame sweep and is thus scanned in two directions of space.

Phase displaced voltages or currents may be produced by inserting into the phase sweepers, as reactive elements, inductances or capacitances in series or parallel to the feeding lines of the dipoles. Figs. 12 to 15 show in principle four examples of inserting capacitative elements 80 or inductive elements 81, respectively, into the dipole leads. Parallel capacitance, Fig. 12, or series inductance, Fig. 15, produces phase lag, series capacitance, Fig. 13, or parallel inductance, Fig. 14, produces phase lead of the dipole excitation. The magnitude of the effect may be controlled by a variable resistance 82 in connection with the reactive elements.

In Fig. 16, I have shown for an arrangement in accordance with Fig. 12 how the rhythmical phase variation may practically be effected by controlling from a generator 22 for sweep oscillations a pair of grid controlled vacuum tubes 83 which embody the variable resistance 82 of Fig. 12. The vacuum tubes 83, parallel to each other and in inverse direction, connected in series with capacitance 80, are parallel to the leads of dipole 49. The magnitude of the resistance and thus the effect of the capacitance may be controlled by applying to the grids 84 a control voltage varied in the rhythm of the scanning process and supplied by sweep generator 22 for line sweeping or frame sweeping.

In order to insert into the dipole circuits variable capacitances 80 or inductances 81, I may also make use of a "reactance tube" as for example illustrated in Fig. 17. Such a reactance tube 86 is provided with two impedances $z_1$ and $z_2$ connected to filament 87 and plate 88 of the tube, the common point of both impedances being connected to a grid 89 of the tube. Either one, $z_1$ or $z_2$, may be an inductance or a capacitance and the other one is a resistance. Another grid is under control of a sweep generator 22.

Another method of supplying the rhythmically phase varying displacing energy component consists in the use of reactors with saturated iron core, of which Fig. 18 shows an embodiment. In order to avoid too large a number of elements, all the phase varying voltages for deflecting the beam in one direction are produced in the same reactor. This reactor, 93, is provided with an exciting winding 62 connected to sweep generator 22. The dipoles towards the left hand side of the array, those of column a, are fed through output elements 94 of a higher number of turns, those towards the right hand side, those of columns b, c, and d, through output elements 95, 96, and 97, respectively, of decreasingly lower numbers of turns. The high frequency flux in the saturated part of the core which is common to the magnetic circuits of the exciting winding and of the output windings thus produces a retarding voltage which is higher at the left hand side of the electric wave converter or array and lower at the right hand side. Since the phases of the high frequency excitation of the dipole columns may be retarded in linear proportion to the values of the abscissae of the columns or their distances from an origin axis which in this example lies to the right, outside of the array, the beam is deflected by an angle given by the variation of the high frequency flux in the common iron core 99 of the reactor. This flux variation in turn is controlled by the excitation current in the low frequency winding 62 of the reactor and this current is fed synchronously with the sweep of the scanning of the image tube.

The steel core of the reactor is dimensioned so as to become saturated with increasing values of the sweep oscillations. This effect may be enhanced by a supplemental constant magnetisation of the core. Owing to this saturation the magnitude of the self-inductive voltages of coils 94 to 97 will vary and thus the phases of the voltages and the currents in the dipole columns a to d will be displaced with regard to the phase of the wave oscillations supplied by oscillator 11. The magnitude of the phase displacing energy component of the dipole oscillations is thus controlled in accordance with the variation of the saturation of the steel core and in the rhythm of the sweep oscillations.

Fig. 19 shows a further embodiment of an arrangement for the scanning of the electric wave beam. A condensor 100 is inductively coupled with a number of dipole columns a, b, c, d, of Fig. 18 by output elements or coils 94, 95, 96, 97, respectively, of different numbers of turns and disposed upon a coupling transformer 101 with iron or air core common to the dipole columns. Each column of dipoles or row of dipoles is thus supplied with a capacitive phase displacing voltage, different in magnitude from that of the other columns or rows, as the case may be, but all in unison, and, when the effective capacitance is rhythmically changed, the wave beam will be oscillated about a transversal or a longitudinal axis. Parallel to condenser 100, there is arranged a pair of electron tubes 102 so as to control or reduce the capacitive reaction of condenser 100 by an amount which is controlled by the grid voltages of tubes 102. By changing these grid voltages, supplied by sweep generator 22, in the rhythm of the sweep oscillations and in accordance with the curve shape thereof, the high frequency excitation of the respective dipoles is being rhythmically varied as to its phase by the proper values and the beam is scanned.

Fig. 20 shows a similar arrangement in which graded inductances 194, 195, 196, 197, on a common air or iron core 104 are inserted, for instance, into the leads of the various columns a, b, c, d, respectively, of dipoles, Fig. 18, and are used for scanning purposes. These inductances act rhythmically phase varying upon the oscillations by being provided with a secondary coil 103 common to them and connected to a pair of vacuum tubes 102 controlled by the sweep oscillations. Tubes 102, by variation of their grid voltages, form a variable resistance and control or reduce the inductive reaction of coil 103. Owing to their connection in inverse sense to the circuits, tubes 102, the same as tubes 102 of Fig. 19 make possible the passage of both half waves of the high frequency antenna current through the modulator.

In Figs. 18 to 20, I have illustrated embodiments of my invention, in which, similarly to Fig. 9, only one scanning device, namely the one allotted to the columns of the electric wave converter or array, has been shown. The arrangement will be provided with a second scanning device, the first for line sweeping, the second for frame sweeping, or conversely, in the same way as Fig. 10 illustrates with respect to Fig. 9. The various elements of the arrangements illustrated in Figs. 9 to 20 may also be combined for a proper effect on the dipoles of the same array; one entire arrangement being always employed for the line sweeping device, another for the frame sweeping device of the wave beams.

Fig. 21 illustrates an electric wave converter or an array of dipoles in which all the dipoles in the longitudinal rows are separately and individually rhythmically varied as to their phases with the fast or line sweep frequency, for example by means of reactance tube devices such as indicated in Fig. 22, while all the dipoles in the transverse columns are separately and individually rhythmically varied as to their phases by the slow, or frame sweep frequency of the scanning process, for example also by means of reactance tubes, such as illustrated in Fig. 22. Both systems of phase sweepers are being controlled or set so as to produce phase displacements of the dipole oscillations in proportion to the distances of the dipoles from one another.

In this embodiment there will be used two controllable reactance devices for each wave converting element or dipole 49, one being inserted in series, between the terminals 109 and 110, and indicated by a variable inductance 107, and the other in parallel, between the terminals 110 and 111, and indicated by a variable capacitance 108. The various settings of the arrows in the variable inductances and the variable capacitances indicate momentary values of the reactances, so as to proportion rhythmical phase variation of the wave frequency oscillations in the dipoles in accordance with the coordinates of the respective dipole in the array, or with the distances of the dipoles from one another in the longitudinal rows or in the transversal columns to which said dipole or wave converting element is attributable with regard to the one or the other sweeping device.

Thus, the electric waves are scanned over the object or over an area of the surface of the earth determined by the magnitudes of the rhythmically phase varying energy components produced in the two sets of phase sweepers.

Scanners for electric wave beams such as described may be used for the emitting as well as for the receiving antenna. Both are scanned synchronously with each other and with the image tube when used in a complete transmitting, receiving and image producing system as shown in Fig. 3. This may be accomplished by using for the control of the scanning processes the oscillations of the same sweep generator; one for line sweeping and one for frame sweeping.

The transmitter will then irradiate only one spot on a surface on the earth and the receiver will respond only to the reflected radiation from the same spot. The waves from this spot reach the common leads from the receiving antenna system to the image device simultaneously, while waves from any other spot on the surface on the earth reach this lead with phase differences, or at different times and therefore cancel themselves by interference.

If transmitter and receiver are mounted adjacent to each other, for instance on an airplane as in Fig. 3, there may be some direct induction by stray fields from the powerful transmitting device to the sensitive receiving device. It is therefore expedient to shield carefully both sender and receiver electrostatically and magnetically against such disturbances.

*Final remarks*

The various useful details known in the art of television as well as of ultra-high-frequency or micro-wave technique may be embodied in the apparatus of my invention, and the experiences made in these arts may be utilized for its purposes.

By using the methods and apparatus of my invention on an aircraft, it is possible to reproduce, by purely electrical means, a detailed image of the pattern of a surface on the earth over which the aircraft flies, even at night or if clouds or fog should develop underneath the aircraft. The radiation of electric waves is not impeded by such atmospheric conditions.

Most of the landmarks, rivers, roads, lakes, or cities with their structures, show contrasts of a linear order of 1 meter or more. By the use of electric waves of proper lengths, the objects can therefore always be resolved an sufficient details be made visible. The orientation of an aircraft is therefore rendered possible under conditions which otherwise might be highly adverse.

Buildings of wood, brick, or concrete, which as a rule contain only slight or unsubstantial metallic structures will reflect the waves only partially and will appear on the image like glass houses. Factories with their steel structures, machine assemblies with concentrated iron bodies, oil tanks of steel sheets, will appear brightly reflecting. Electric power lines, oil pipe lines, and railroad tracks will also be brightly visible particularly by the use of waves polarized in the longitudinal extension of these lines or tracks. Trains or other objects, like airplanes, moving underneath the observation aircraft will likewise reflect the radiation. Ships with heavy steel bodies of high conductivity and permeability will reflect the radiation differently from the surrounding water which is of moderate conductivity and of high dielectric constant, and these ships will therefore clearly mark themselves on the image. Even submarines under the water surface will be visible down to a certain depth until the absorption of the electric waves by the water will extinguish the reflection of the steel body.

I claim:

1. In an apparatus for producing an image of the electric pattern of a distant object corresponding to the contrasts in the electric and magnetic properties thereof, in combination, a directional electric wave converter for converting one into the other conductor-bound energy and wave energy and concentrating said wave energy into an electric wave beam, said electric wave converter comprising a plurality of wave converting elements geometrically distributed in a two-coordinate system about a common origin, a scanner comprising a generator for rhythmic sweep oscillations, for oscillating in the rhythm of said sweep oscillations in space said beam of electric waves and sweeping it across said object, said scanner having coupled thereto a phase sweeper adapted to be excited from said conductor bound energy and having control elements coupled to said generator for sweep oscillations, reactive elements, and output elements, for supplying to said electric wave converter an energy component displaced with respect to said conductor-bound energy for varying the phases of the oscillations within said wave converting elements by means of said reactive elements and controlling said phase varying energy component in its magnitude according to the curve shape of said sweep oscillations and in the rhythms thereof, said output elements connected to the various of said electric wave converting elements and proportioned in accordance with the respective distances thereof from the said origin in said electric wave converter, said output elements thus adapted to distribute the phase sweeping energy component over the several of said wave converting elements in proportion to the respective distances of said wave converting elements from said origin.

2. In an apparatus for producing an image of the electric pattern of a distant object corresponding to the contrasts in the electric and magnetic properties thereof, in combination, a directional electric wave converter for converting one into the other conductor-bound energy and wave energy and concentrating said wave energy into an electric wave beam; said electric wave converter comprising a plurality of wave converting elements geometrically disposed in a two-coordinate system about a common origin, each of said elements as to its position in said electric wave converter thus being attributable to two systems according to its coordinates, two scanners, each of said scanners comprising a generator for rhythmic sweep oscillations, for oscillating in the rhythm of said sweep oscillations in space a beam of electric waves converted by said electric wave converter, one of said generators for oscillations rhythmically sweeping said beam across said object in one direction, in accordance with one of said systems, the other of said generators for sweep oscillation rhythmically sweeping said beam along said object in another direction, in accordance with the other of said systems, each of said scanners having coupled thereto a phase sweeper, each of said phase sweepers adapted to be excited from said conductor bound energy and having control elements coupled to the appertaining of said generators, each of said phase sweepers further having reactive elements and output elements, for supplying to said electric wave converter an energy component displaced with respect to the phase of said conductor-bound energy for varying the phases of the oscillations within said wave converting elements by means of said reactive elements and controlling by means of said control elements the phase varying energy component in its magnitude according to the curve shape of the sweep oscillations of the appertaining of said sweep generators and in the rhythm thereof, said output elements coordinated into two distributing sets for said phase varying energy component, one of said distributing sets coupled to one of said systems, the other of said distributing sets coupled to the other of said systems, said output elements of each of said distributing sets connected to the various of said wave converting elements and proportioned in accordance with the respective distances thereof from said origin, each of said wave converting elements, thus being supplied, simultaneously, with two phase varying energy components respectively proportioned in accordance with its two coordinates and controlled in their magnitude in accordance with the shape of the respective sweep oscillation and in the rhythm thereof.

3. A scanning device as set forth in claim 1 in which said output elements connected to the various of said wave converting elements are windings of a transformer, said windings having numbers of turns in magnitude and sign proportioned in accordance with the distance from said origin of the respective wave converting element in said electric wave converter.

4. In an apparatus for producing an image of the electric pattern of a distant object corresponding to the contrasts in the electric and magnetic properties thereof, in combination, a directional electric wave converter for converting one into the other conductor-bound energy and wave energy and concentrating said wave energy into an electric wave beam, said electric wave converter comprising a plurality of wave converting elements geometrically disposed in a two-coordinate system about a common origin, a scanner comprising a generator for rhythmic sweep oscillations for oscillating in the rhythm of said sweep oscillations in space said beam of electric waves and sweeping said beam across said object, a phase sweeper coupled to said scanner and comprising reactances connected to the various of said wave converting elements and proportioned in accordance with the respective distances thereof from said origin; grid controlled vacuum tubes coupled with their plates and filaments to said reactances, the control grids of said tubes connected to, and controlled by the oscillations of, said sweep generator for controlling rhythmically the magnitude of the output of said reactances in accordance with the curve shape of said sweep oscillations and in the rhythm thereof for supplying to said electric wave converter an energy component displaced with respect to the phase of said conductor-bound energy with its magnitude varying in the rhythm of said sweep oscillations.

5. An apparatus for producing an image of the electric pattern of a distant object corresponding to the contrasts in the electric and magnetic properties thereof, said apparatus including an oscillator for producing electric waves, a directional electric wave converter connected thereto for converting one into the other conductor-bound energy and wave energy and concentrating said wave energy into an electric wave beam, and a scanner including a sweep generator and a phase sweeper, said sweep generator comprising an oscillatory electromagnetic system for producing rhythmical sweep oscillations, said phase sweeper coupled with said sweep generator and said directional electric wave converter and comprising reactive elements and oscillation responsive control elements coupled to both said sweep generator and said directional electric wave converter and controlled in the rhythms of both wave oscillations and sweep oscillations for producing by means of said reactive elements and supplying to said electric wave converter an energy component displaced with respect to the phase of the conductor-bound energy of said electric wave converter and oscillating under the control of said control elements in the frequency of said electric wave energy but as to its magnitude in the rhythm of said sweep oscillations and in accordance with the curve shape thereof; said phase sweeper further having output elements for distributing the phase varying energy component over said wave converter, thereby to scan said pattern by means of said electric wave beam.

6. An apparatus for producing an image of the electric pattern of a distant object corresponding to the contrasts in the electric and magnetic properties thereof, said apparatus including an oscillator for producing electric waves, a directional electric wave converter connected thereto for converting one into the other conductor-bound energy and wave energy and concentrating said wave energy into an electric wave beam, and a scanner including a sweep generator and a phase sweeper; said sweep generator comprising an oscillatory electromagnetic system for producing rhythmical sweep oscillations, said electric wave converter comprising a plurality of wave converting elements geometrically distributed in a two-coordinate system about a common origin in said electric wave converter; said phase sweeper coupled with said sweep generator and said directional electric wave converter and comprising reactive elements and oscillation responsive control elements coupled to both said sweep generator and said directional electric wave converter and controlled in the rhythms of both wave energy and sweep oscillations for producing by means of said reactive elements and supplying to said electric wave converter an energy component displaced with respect to the phase of the conductor-bound energy of said electric wave converter and oscillating under the control of said control elements in the frequency of said electric wave energy but as to its magnitude in the rhythm of said sweep oscillations and in accordance with the curve shape thereof; said phase sweeper further having output elements for distributing over over said wave converting elements the phase varying energy component in proportion to the respective distances of said wave converting elements from said origin.

REINHOLD RÜDENBERG.

REFERENCES CITED

The following references are of record in the file of this patent:

UNITED STATES PATENTS

| Number | Name | Date |
| --- | --- | --- |
| 2,030,181 | Potter | Feb. 11, 1936 |
| 2,245,660 | Feldman | June 17, 1941 |
| 2,403,728 | Loughren | July 9, 1946 |
| 2,403,729 | Loughren | July 9, 1946 |
| 2,407,169 | Loughren | Sept. 3, 1946 |